United States Patent [19]

Feltzin

[11] 3,922,426

[45] Nov. 25, 1975

[54] METHOD OF MAKING FILAMENT WOUND ARTICLE

[75] Inventor: Joseph Feltzin, Wilmington, Del.

[73] Assignee: ICI America Inc., Wilmington, Del.

[22] Filed: Mar. 16, 1973

[21] Appl. No.: 341,991

[52] U.S. Cl. ................ 428/295; 156/169; 156/173; 156/175; 156/272; 204/159.15; 204/159.23

[51] Int. Cl. ........................ B31c 13/00; B65h 81/00

[58] Field of Search ........... 156/173, 175, 272, 169; 204/159.15, 159.23; 96/115 P; 161/195, 233

[56] References Cited

UNITED STATES PATENTS

| | | | |
|---|---|---|---|
| 2,634,251 | 4/1953 | Kass | 161/185 |
| 3,156,598 | 11/1964 | Martin | 156/175 |
| 3,214,491 | 10/1965 | Stanton | 161/195 |
| 3,374,160 | 3/1968 | Mao | 204/159.23 |
| 3,714,007 | 1/1973 | Borrel | 156/272 |
| 3,782,961 | 1/1974 | Takahashi et al. | 204/159.15 |

OTHER PUBLICATIONS

Horn et al., "Ultraviolet Curing Polyester Preimpregnation Materials For Vacuum Bag Laminates And Filament Winding," 21st Annual Meeting of the Reinforced Plastics Division of the Society of the Plastics Industry, Inc., Section 7-C, pp. 1-6.

*Primary Examiner*—Daniel J. Fritsch

[57] ABSTRACT

The present invention relates to an improved process for the preparation of a filament wound article which comprises coating or impregnating a filament with a photopolymerizable resin matrix comprising an ethylenically unsaturated polyester, an ethylenically unsaturated copolymerizable monomer, an organic peroxide, and at least one sensitizer characterized by the formula

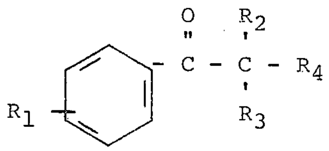

where $R_1$ is —H, —Br, or —$CH_3$, $R_2$ is —H or —Br, $R_3$ is —H or —$CH_3$, and $R_4$ is —H or —$CH_3$, and wherein at least one of $R_1$ and $R_2$ is —Br, forming the filament into the shape of the desired article, and subjecting the resin to ultraviolet, electromagnetic radiation to copolymerize the ethylenically unsaturated polyester and ethylenically unsaturated copolymerizable monomer.

10 Claims, No Drawings

METHOD OF MAKING FILAMENT WOUND ARTICLE

BACKGROUND OF THE INVENTION

1. Field of the Invention

This invention relates to an improved process for the preparation of filament wound articles. More particularly, this invention relates to an improved process for the preparation of filament wound articles wherein the filament is coated or impregnated with a photopolymerizable resin matrix and the resin is subjected to the influence of ultraviolet, electromagnetic radiation to cure the resin.

2. Brief Description of the Prior Art

Filament wound articles, such as, storage tanks, railway tank cars, pipe, space vehicle components, pressure vessels, jato motors, hydrospace vehicles, boats, gun barrels, shell grommets, electrical equipment, ducts, tubes, casings, etc., have been produced for a number of years using a wide variety of thermosetting resins, such as, epoxy resins, polyester resins, phenolic resins, silicone resins, polybenzimidazole resins, etc. The preparation of these filament wound articles are described in the following publications: U.S. Pat. Nos. 2,843,153; 3,047,191; 3,486,655; 3,519,012; and 3,576,705; "Filament Winding: Its Development, Manufacture, Application, and Design," Rosato et al., Interscience Publishers, (1964); and "Ultraviolet Curing Polyester Preimpregnated Materials for Vacuum Bag Laminates and Filament Winding," Horn et al., 21st Annual Meeting of the Reinforced Plastics Division of The Society of the Plastics Industry, Inc., Section 7-C, Pages 1–6. While a variety of techniques have evolved to prepare such articles, the process basically involves combining a thermosetting resin with a reinforcing filament, winding the filament around a mandrel, and then curing the resin to produce a hard filament reinforced plastic article having the general shape of the mandrel.

The use of a solution of an unsaturated polyester dissolved in a copolymerizable ethylenically unsaturated monomer as the resinous matrix to envelop the filaments has found widespread use. The resin matrix usually contains a polymerization initiator such as an organic peroxide and a chemical activator such as cobalt and/or an amine or both. However, the use of unsaturated polyester-unsaturated monomer solutions as resin matrixes has been limited somewhat due to the disadvantages inherent in such processes prior to the present invention. One problem heretofore in the use of unsaturated polyester-unsaturated monomer resin matrixes has been that after the addition of the catalyst and promoter to the matrix, the working life thereof is limited to, at most, approximately 1 hour. This means that successive batches of resin have to be mixed continually, thereby increasing labor costs and chance of error. A second problem inherent in the use of unsaturated polyester-unsaturated monomer resin matrix heretofore has been that in winding the filament around the mandrel, the pressure of the filaments on the mandrel and on each other squeezes the resin away from the surface of the filament so that many of the properties resulting from the polyester resin cannot be obtained. Another problem has been that the ethylenically unsaturated monomer used to dissolve the polyester tends to evaporate during preparation of the wound article. If the resin is cured rapidly at high temperature, the monomer boils off before it can begin to react with the unsaturated polyester; if the cure temperature is low, the monomer tends to evaporate before it has sufficient time to copolymerize with the unsaturated polyester. Attempts have been made to cure the polyester resin matrix by subjecting the resin to hard radiation such as electron beam or cobalt 60 X-rays. The problem with this process is that the hard radiation used requires massive shielding and is extremely hazardous.

SUMMARY OF THE INVENTION

The present invention is broadly directed to the unexpected discovery of an improved process for the preparation of filament wound articles which comprises coating or impregnating the filament with a resinous matrix comprising an ethylenically unsaturated polyester, ethylenically unsaturated monomer, organic peroxide, and at least one sensitizer characterized by the formula

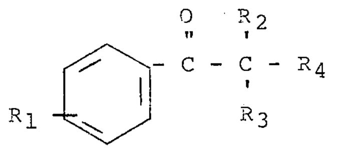

where $R_1$ is —H, —Br, or —$CH_3R_2$ is —H or —Br, $R_3$ is —H or —$CH_3$, and $R_4$ is —H or —$CH_3$, and wherein at least one of $R_1$ and $R_2$ is —Br, and subjecting the resin matrix to ultraviolet, electromagnetic radiation to copolymerize the unsaturated polyester and unsaturated monomer. Teh resin matrix employed in the process of this invention has an almost indefinite pot life as the resin will cure only when activated by subjecting it to ultraviolet radiation. Upon exposure of the resin matrix to ultraviolet radiation, gellation of the resin matrix occurs rapidly, usually in less than 45 seconds. This provides a resin rich inner layer because the rapid gellation eliminates the squeezing out of the polyester by the pressure of overlapping filaments being wound and the evaporation of the ethylenically unsaturated monomer. The process of this invention also eliminates the need to wait for the resin catalyst to cure after the filament wound structure is fully fabricated. Using the process of this invention, the filament wound structure is curing during the fabrication process itself and thereby results in a nearly fully cured structure at the end of the fabrication process. Furthermore, the process of this invention is safer and not as expensive as processes requiring the use of hard radiation. The process of this invention requires a relatively inexpensive ultraviolet light source and protection can be achieved with aluminum foil for shielding.

Description of Preferred Embodiments of the Invention

The ethylenically unsaturated polyesters which may be employed in the resin matrixes used in the process of this invention are well known and comprise the reaction product of at least one ethylenically unsaturated dicarboxylic acid or anhydride and at least one polyol. A preferred class of polyesters are substantially free of aromatic hydroxyl groups. Illustrative examples of the polyols which may be used to form the polyester compositions are aliphatic glycols, such as, ethylene glycol, diethylene glycol, propane diol, butane diol, and hexane diol, trimethylol propane, pentaerythritol, and alkylene oxide ethers of phenols, such as, 2,2-di(4-hydroxyphenyl) propane; di(4-hydroxyphenyl)methane; 2,2-di(3-methyl-4-hydroxyphenyl)butane; 4,4′-dihydroxybiphenyl; hydrogenated 2,2′-di(4-hydroxyphenyl)propane; 2,4-dihydroxybenzophenone; 4,4′-dihydroxydiphenylether; 4,4′-dihydroxydiphenylsulphone; and 4,4′-dihydroxydiphenylketone. Mixtures of polyols may also be used.

A preferred class of polyols are those represented by the general formula

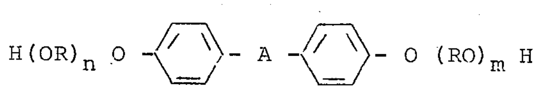

wherein $n$ and $m$ are integers and the sum of $n$ and $m$ is from 2 to 20, A is an alkylene radical having from 1 to 4 carbon atoms and R is an alkylene radical having from 2 to 4 carbon atoms. The polyoxyalkylene ether polyols corresponding to the above formula are disclosed in U.S. Pat. No. 2,331,265, the disclosure of which is incorporated hereinto by reference.

Illustrative examples of ethylenically unsaturated dicarboxylic acids or anhydride which may be used in accordance with the present invention include maleic acid, fumaric acid, and maleic anhydride.

The aforesaid polyester compositions may also be prepared by the reaction of a polyol and a mixture of an ethylenically unsaturated dicarboxylic acid and saturated dicarboxylic acid, such as adipic acid, phthalic acid, isophthalic acid, succinic acid, and glutaric acid. At least about 50% of the dicarboxylic acid moiety of the polyester composition is contributed by an ethylenically unsaturated dicarboxylic acid or anhydride.

A more detailed description of the polyesters which may be used in accordance with this invention may be found in U.S. Pat. Nos. 2,634,251 and 3,214,491, the disclosures of which are hereby incorporated hereinto by reference.

The ethylenically unsaturated copolymerizable compounds which are employed herein include the unsaturated copolymerized compounds usually employed with unsaturated polyesters. Among the numerous ethylenically unsaturated copolymerizable monomers which may be used are styrene, vinyl toluene, chlorostyrene, diallyl phthalate, acrylonitrile, divinylbenzene methyl methacrylate, vinyl acetate, ethylacrylate, vinyl pyridine, 2-ethyl-hexyl acrylate, acrylic acid, allyl acetate, allyl acrylate, phthalic acid, diallyl ester, triallyl phosphate, and triallyl cyanurate. Preferred monomers are vinylidene monomers.

The organic peroxide which is employed in the photopolymerizable composition of this invention may be any peroxide which decomposes at temperatures from 25° to 172°C. to form free radicals. A preferred class of organic peroxides includes those which have a decomposition rate such that at least 50% of the peroxide decomposes to form free radicals in less than 10 hours at temperatures of 25° to 172°C. A preferred organic peroxide for use in accordance with the present invention is tertiary butyl peroxy pivalate. Illustrative examples of other organic peroxides which may be employed include tertiary butyl perbenzoate, dicumyl peroxide, lauroyl peroxide, cumyl butyl peroxide, benzoyl peroxide; 2,4-dichlorobenzoyl peroxide; methyl ethyl ketone peroxide; decanoyl peroxide; caprylyl peroxide; propionyl peroxide; acetyl peroxide; p-chlorobenzoyl peroxide; t-butyl peroxyisobutyrate; hydroxyheptyl peroxide; cyclohexanone peroxide; 2,5-dimethylhexyl-2,5-di-(peroxybenzoate); t-butyl peracetate; di-t-butyl diperphthalate; 2,5-dimethyl-2,5-di-(t-butyl peroxy)hexane; t-butyl hydroperoxide; di-t-butyl peroxide; 2,5-dimethyl-2,5-di-(t-butyl peroxy)hexyne-3, p-methane hydroperoxide; 2,5-dimethyl hexyl-2,5-dihydroperoxide; cumene hydroperoxide; and succinic acid peroxide. The photopolymerizable compositions of this invention may contain one or a combination of organic peroxides. It is essential that the photopolymerizable compositions contain an organic peroxide as no photocuring is observed unless a peroxide is present.

The amount of organic peroxide which is employed in the photopolymerizable composition of this invention is, of course, dependent upon many variables including the particular peroxide used, the wave length of the ultraviolet light employed, the irradiation time, and the nature of and amount of ethylenically unsaturated polyester and ethylenically unsaturated copolymerizable monomer present in the resinous matrix. Generally, the amount of organic peroxide is within the range of 0.1% to 5% by weight, and preferably from 0.5% to 2% by weight, based on the weight of the ethylenically unsaturated photopolymerizable compounds present in the initial composition.

Illustrative examples of sensitizers within the aforesaid formula include alpha-bromoacetophenone, alpha-bromopropiophenone, alpha-bromoisobutyrophenone, para-bromoacetophenone, para-bromoisobutyrophenone, para-bromopropiophenone, alpha-para-dibromoacetophenone, alpha-para-dibromoisobutyrophenone, alpha-para-dibromopropiophenone, para-methyl-alpha-bromoacetophenone, para-methyl-alpha-bromoisobutyrophenone, and para-methyl-alpha-bromopropiophenone.

The quantity of sensitizer used is dependent upon many variables, including the particular wave length of ultraviolet light employed, irradiation time, and the nature and amount of ethylenically unsaturated polyester and ethylenically unsaturated copolymerizable monomer present. Generally, the amount of sensitizer employed is within the range of 0.01 to 5% by weight, and preferably from 0.1 to 2% by weight, based on the total weight of ethylenically unsaturated material initially present in the resinous matrix. A particularly preferred amount of sensitizer is from 0.2% to 1% by weight, based on the total weight of ethylenically unsaturated material present in the composition to be cured.

The photopolymerizable resin matrixes used in this invention may also contain a chain transfer agent. Illustrative examples of chain transfer agents include the mercaptans and derivatives thereof, such as, glycol mercaptoacetate and ethyl mercaptoacetate; tertiary aliphatic amines, such as triethanol amine and tertiary butyl diethanol amine, morpholine, n-amino-morpholine, and cyclic unsaturated hydrocarbons, such as neohexene, cyclohexene, cyclooctene, and mixtures thereof. The amount of transfer agent employed may vary from 0.5 to 25 weight percent of the total resin composition.

In addition to the above-described ingredients, the resin matrixes used herein may contain additional agents conventionally used in the resin matrixes for preparing filament wound articles, including, stabilizers, dyes, pigments, plasticizers, lubricants, glass fibers, and other modifiers which are conventional in the art to obtaining certain desired characteristics in the finished product.

The photopolymerizable resinous matrix employed in the process of this invention may be polymerized or cured by exposing the resin to any source of eletromagnetic radiation wherein at least 30% of the said radiation has a wave length below 4,000 angstroms, that is, at least 30% of the radiation to which the resinous matrix is exposed has a wave length in the ultraviolet range. When the photopolymerizable compositions are exposed to ultraviolet light, the resin, after a brief induction period, is rapidly polymerized or cured.

Suitable sources of ultraviolet light for curing the photopolymerizable resinous matrix used herein include mercury, tungsten, and xenon lamps, carbon arcs, mercury vapor lamps, fluorescent lamps, argon glow lamps, photographic flood lamps, and any other suitable source of ultraviolet, electromagnetic radiation.

The polymerization of the polyester resinous matrix used in the process of this invention may be carried out in the presence of atmospheric oxygen.

The term "filament" as used in the present specification and claims is not limited to filamentary material as commonly envisaged. Elements in accordance with the invention are considered as being filamentary whether of the commonly considered circular, cross-sectional form or of a flat ribbon-like form. In this flat formation they also may fall into the catagory of what normally may be considered as a band. As contemplated in this application, however, bands, besides being individual elements of ribbon-like form, may be composed of elements formed of a plurality of filaments laid side by side. Thus the bindings forming the principal structure of the articles prepared by the process of this invention may be of anything from individual filaments of fibrous materials in their commonly accepted circular, cross-sectional form, to bands of ribbon-like form, whether such bands be single integral members or be made up of a plurality of filaments. The filaments may be comprised of natural or synthetic material. A preferred filament is made of glass.

In order that those skilled in the art may better understand how the present invention may be practiced, the following illustrative examples are given. These examples are set forth solely for the purpose of illustration and any specific enumeration of details contained therein should not be interpreted as expressing limitations of this invention. All parts and percentages are by weight, unless otherwise specified.

The ethylenically unsaturated polyester which is employed in the following illustrative examples is prepared according to the following procedure: A 3-liter, glass, round-bottom flask is fitted with mechanical stirrer, carbon dioxide inlet tube, temperature indicator, and distillation head. The flask is charged with 1566 grams of polyoxyproplene (2.2) and 2,2-di(4-hydroxyphenyl)propane. While the glycol is warmed and stirred, 512 grams of fumaric acid are added along with 1.04 grams of hydroquinone. When addition to these ingredients is complete, carbon dioxide is bubbled into the mass, stirring rate is set at 130 rpm, and the reactants are heated to 210°C. These conditions are maintained for 6 hours, at which time the reaction product has an acid number of 31. The product is labeled "Polyester A." "Polyester B" is prepared by the foregoing procedure except that the glycol used is polyoxypropylene (16) 2,2-di-(4-hydroxyphenyl)-propane. Four parts of Polyester A and one part of Polyester B are dissolved in five parts of styrene and the resulting solution is employed in examples 1–8.

A glass filament is passed through a system of pulleys which provide a tension of about 2 pounds and then passed through a small hole which squeezes off excess resin. The filament saturated with resin is then passed through a ring which is attached to a traverse which guides the filament horizontally along a rotating mandrel. The traverse is set so that it takes 5 minutes to travel from one end of the mandrel to the other and the madnrel speed is adjusted so that even winding results with no overlapping and no gaps between each revolution of winding. As the filament reaches the opposite end of the mandrel, the traverse automatically reverses and winds on top of the previous layer. The number of passes depends on the desired thickness of the filament wound structure. The light source used is a Hanovia high pressure quartz mercury vapor lamp, Model 819A. The ultraviolet light source is placed above the rotating mandrel. After the last layer is wound, the mandrel and traverse are stopped and the ultraviolet light is left on for 10 minutes to provide curing of the final layer. the ultraviolet light is then turned off and the system is allowed to cool. The resin bath comprises the indicated sensitizer and the indicated organic peroxide dissolved in a resin solution prepared by dissolving one part of the above-described polyester solution in one part of styrene. The attached table shows various combinations of sensitizer, organic peroxide, distance light is above mandrel, curing time, number of passes or layers, inside diameter of pipe, percent glass, and properties of the resulting filament wound article.

TABLE I

| Ex. No. | Sensitizer | Peroxide | Ultra-violet Curing Time in Minutes | Light Dis-tance in Inches | Num-bered Passes | Barcol[1] Hardness | % Glass | Split D Tensile Strength psi | Average Inter Laminar Shear psi | Com-pressive[2] Modular 10% Deflection psi | Inside Dia-meter in Inches |
|---|---|---|---|---|---|---|---|---|---|---|---|
| 1 | 1% BMPP[3] | 1% TBPP[4] | 38 | 5 | 6 | 20–35 | 68.9 | — | — | — | 3.5 |
| 2 | 1% BMPP | 2.5%[5] | 37 | 5 | 6 | 30–50 | 63.5 | — | | — | 3.5 |
| 3 | 1% BMPP | 2.5%[5] | 40 | 5 | 6 | 47–53 | 65.1 | — | | — | 3.5 |
| 4 | 1% BMPP | 2.5%[5] | 40 | 3.5 | 6 | 18–22 | 61.0 | 92,400 | 3875 | 58 | 6 |
| 5 | 1% BMPP | 1%[5] | 50 | 3.5 | 10 | 48–51 | 57.8 | 92,300 | 4041 | 88 | 6 |
| 6 | 1% BMPP | 1% TBPP | 50 | 3.5 | 10 | 43–48 | 59.4 | 94,100 | 4190 | 85 | 6 |
| 7 | 1% BMPP | 1.25 [5] | 50 | 3.5 | 10 | 38–42 | 55.0 | 80,500 | 4395 | 111 | 6 |
| 8 | 1% BMPP | 1.25%[5] | 40 | 2 | 10 | 35–41 | 49.9 | 77,000 | 3592 | 128 | 6 |

[1]Inner Surface
[2]ASTM D-2412
[3]BMPP = 2-bromo-2 methyl propiophenone
[4]TBPP = 75% solution of t-butyl peroxy pivalate
[5]Fine dispersion of peroxides obtained from U.S. Peroxygen Corp. as UV-50.

The Examples 9 through 15 show the preparation of filament wound pipes using various organic peroxides and sensitizers. The procedure used is identical with the procedure used in Example 1, except for the organic peroxide and sensitizer employed. In all cases, the filament would pipe had excellent Barcol hardness, tensile strength, and laminar shear. The particular organic peroxides and sensitizers used are shown in Table II.

TABLE II

| Example Number | Organic Peroxide | Sensitizer |
|---|---|---|
| 9 | Lauryl Peroxide | Alpha-bromoacetophenone |
| 10 | Benzoyl Peroxide | Alpha-bromopropiophenone |
| 11 | Tertiary Butyl Perbenzoate | Alpha-bromoisobutyrophenone |
| 12 | p-chlorobenzoyl Peroxide | Para-bromoacetophenone |
| 13 | Tertiary Butyl Peroxy Pivalate | Para-methyl-alpha-bromoacetophenone |
| 14 | Cumyl Butyl Peroxide | Alpha-para-dibromoacetophenone |
| 15 | Tertiary Butyl Peroxy Pivalate | Para-bromoisobutyrophenone |

Although this invention has been described with reference to specific sensitizers, ehtylenically unsaturated polyesters, organic peroxides, and ethylenically unsaturated copolymerizable monomers and to specific reaction conditions, it will be appreciated that numerous other sensitizers, organic peroxides, ehtylenically unsaturated polyesters, and ethylenically unsaturated copolymerizable monomers may be substituted for those described and that the particular reaction conditions employed may be modified, all within the spirit and scope of this invention.

Having described the invention, what is claimed and desired to be secured by Letters Patent is:

1. In a method of making a filament wound article from filament coated or impregnated with polyester resin matrix which comprises coating or impregnating filament with a polyester resin matrix, winding the filament around a mandrel, and curing the resin, the improvement which comprises coating or impregnating the filament with a photopolymerizable resin matrix comprising an ethylenically unsaturated polyester, an ethylenically unsaturated copolymerizable monomer, an organic peroxide, and at least one sensitizer characterized by the formula

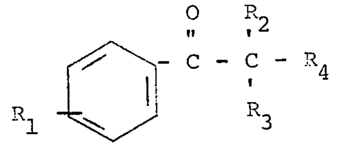

where $R_1$ is —H, —Br, or —$CH_3$, $R_2$ is —H or —Br, $R_3$ is —H or —$CH_3$, and $R_4$ is —H or —$CH_3$, and wherein at least one of $R_1$ and $R_2$ is —Br, and subjecting the photopolymerizable resin to ultraviolet electromagnetic radiation to cure the resin.

2. A process of claim 1 wherein the sensitizer is alpha-bromoisobutyrophenone.

3. A process of claim 1 wherein the sensitizer is 4'-bromoacetophenone.

4. A process of claim 1 wherein the sensitizer is alpha-bromoacetophenone.

5. A process of claim 1 wherein the ethylenically unsaturated polyester is an ester of maleic acid, fumaric acid, or maleic anhydride and a polyol represented by the formula

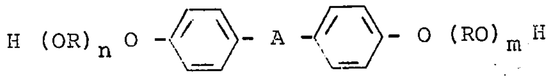

wherein $n$ and $m$ are integers and the sum of $n$ and $m$ is from 2 to 20, A is an alkylene radical having from 1 to 4 carbon atoms, and R is an alkylene radical having from 2 to 4 carbon atoms.

6. A process of claim 5 wherein the polyol is a polyoxypropylene ether of 2,2-di(4-hydroxyphenyl)propane.

7. A process of claim 5 wherein the ethylenically unsaturated copolymerizable monomer is styrene.

8. A process of claim 1 wherein the organic peroxide is t-butyl peroxy pivalate.

9. A process of claim 7 wherein the organic peroxide is t-butyl peroxy pivalate.

10. A filament wound article prepared by the process of claim 1.

* * * * *